United States Patent
Navalekar et al.

(10) Patent No.: US 9,948,541 B2
(45) Date of Patent: Apr. 17, 2018

(54) FULL DUPLEX SERVICES USING RTS/CTS

(71) Applicant: Parallel Wireless, Inc., Nashua, NH (US)

(72) Inventors: Abhijit Navalekar, Westford, MA (US); Rajesh Kumar Mishra, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 14/523,401

(22) Filed: Oct. 24, 2014

(65) Prior Publication Data

US 2015/0117269 A1 Apr. 30, 2015

Related U.S. Application Data

(60) Provisional application No. 61/894,961, filed on Oct. 24, 2013.

(51) Int. Cl.
*H04L 12/751* (2013.01)
*H04L 5/14* (2006.01)

(52) U.S. Cl.
CPC ............. *H04L 45/02* (2013.01); *H04L 5/143* (2013.01); *H04L 5/1438* (2013.01)

(58) Field of Classification Search
CPC ... H04L 45/02; H04L 45/745; H04L 45/1438; H04L 5/14
USPC .......................................... 370/277, 328–330
See application file for complete search history.

(56) References Cited

U.S. PATENT DOCUMENTS

| 7,817,641 | B1 | 10/2010 | Khandani | |
|---|---|---|---|---|
| 8,675,550 | B2 | 3/2014 | Rao et al. | |
| 9,319,210 | B2 | 4/2016 | Choi et al. | |
| 2005/0059342 | A1* | 3/2005 | Engels | H04B 7/2606 455/7 |
| 2006/0114851 | A1* | 6/2006 | Gupta | H04L 47/14 370/329 |

(Continued)

FOREIGN PATENT DOCUMENTS

| WO | 2011137118 A1 | 11/2011 |
|---|---|---|
| WO | 2013048582 A1 | 4/2013 |
| WO | 2013173250 A1 | 11/2013 |

OTHER PUBLICATIONS

Amir K. Khandani, Two-Way Wireless, Presentation dated Apr. 25, 2012, http://www.cst.uwaterloo.ca/content/Complete_Presentation_NoSound.pdf.

(Continued)

*Primary Examiner* — Edan Orgad
*Assistant Examiner* — Emmanuel Maglo
(74) *Attorney, Agent, or Firm* — Michael Saji

(57) ABSTRACT

Systems and methods are described for point-to-point and point-to-multipoint full duplex networking. In some embodiments, physical, medium access control (MAC), and routing protocols are integrated. In some embodiments, cross-layer optimization by the use of a full duplex capability table in performing routing and messaging is used to increase the channel utilization of full duplex networks, thereby making it possible for multiple nodes to communicate simultaneously over the same channel. In some embodiments, such full duplex capability is provided using Wi-Fi or Wi-Fi-like wireless protocols in a mesh network.

20 Claims, 6 Drawing Sheets

(56) References Cited

U.S. PATENT DOCUMENTS

| | | | | |
|---|---|---|---|---|
| 2008/0316963 | A1* | 12/2008 | Huang | H04W 74/0808 370/329 |
| 2009/0005005 | A1 | 1/2009 | Forstall et al. | |
| 2009/0323621 | A1 | 12/2009 | Touboul et al. | |
| 2010/0260146 | A1 | 10/2010 | Lu | |
| 2013/0084873 | A1 | 4/2013 | Sharony et al. | |
| 2013/0102254 | A1 | 4/2013 | Cyzs et al. | |
| 2013/0301487 | A1 | 11/2013 | Khandani | |
| 2014/0078940 | A1* | 3/2014 | Aggarwal | H04L 1/1854 370/278 |
| 2014/0169279 | A1* | 6/2014 | Song | H04W 72/082 370/329 |
| 2015/0172038 | A1 | 6/2015 | Jiang et al. | |

OTHER PUBLICATIONS

System Scenarios and Technical Requirements for Full-Duplex Concept, Duplo Deliverable D1.1, Feb. 5, 2013, DUPLO Project, Ref Ares(2013)995794, http://www.fp7-duplo.eu/images/docs/Deliverables/D1_1_v_1.0.pdf.

Dinesh Bharadia, Emily McMilin, & Sachin Katti, Full Duplex Radios, SIGCOMM '13, Aug. 12-16, 2013, http://web.stanford.edu/~skatti/pubs/sigcomm13-fullduplex.pdf.

Steven Hong, Joel Brand, Jung Il Choi, Mayank Jain, Jeff Mehlman, and Philip Levis, Applications of Self-Interference Cancellation in 5G and Beyond, IEEE Communications Magazine, Feb. 2014, vol. 52, No. 2, http://cms.comsoc.org/SiteGen/Uploads/Public/Docs_TC_5GMWI/Applications_of_Self-Interference.pdf.

Bernhard Schulz, LTE Transmission Modes and Beamforming, Rohde and Schwarz, May 2014, 1MA186_1e, http://www.scribd.com/doc/283273003/1MA186-1e-LTE-Transmission-Modes-and-Beamforming#scribd.

Nicholas A. Estep, Dimitrios L. Sounas, Jason Soric & Andrea Alù, Magnetic-Free Non-Reciprocity and Isolation Based on Parametrically Modulated Coupled-Resonator Loops, Nature Physics 10, 923-927 (2014), published online Nov. 10, 2014, http://www.nature.com/nphys/journal/v10/n12/full/nphys3134.html.

Wireless Full Duplex—A Revolution in Wireless Design, Kumu Networks, Retrieved Sep. 19, 2014, http://kumunetworks.com.

Steven Hong, Joel Brand, Jung Il Choi, Mayank Jain, Jeff Mehlman, Kumu Networks, Sachin Katti, and Philip Levis, Kumu Networks and Stanford University, "Applications of Self-Interference Cancellation in 5G and Beyond," IEEE Communications Magazine, Feb. 2014, at 114-121.

Alex Blate, "Full Duplex Radio," Slide Show Presentation, Sep. 27, 2013.

Dinesh Bharadia, Emily McMillin, Sachin Katti, "Full-duplex," Stanford Networked Systems Group, (Feb. 19, 2015), http://snsg.stanford.eduiprojects/full-duplex/.

Amir K. Khandani, "Two-Way Wireless," Slide Show Presentation, Apr. 25, 2012.

* cited by examiner

Node 1

| | Tx | Rx | Weight | FDC |
|---|---|---|---|---|
| Node 0 | 0 | 1 | 0.9 | 1 |
| Node 2 | 1 | 0 | 0.1 | 0 |

FIG. 2

FULL DUPLEX SERVICES USING RTS/CTS

CROSS-REFERENCE TO RELATED APPLICATIONS

This application claims the benefit of priority under 35 U.S.C. § 119(e) of U.S. Provisional Patent Application No. 61/894,961, filed Oct. 24, 2013, entitled "Methods for Implementing Full Duplex Services Over a Mesh Network," which is hereby incorporated by reference in its entirety.

BACKGROUND

In case of traditional wireless networks, the physical layer is implemented as a half-duplex channel and only achieves full duplex by either time multiplexing (time division duplex, or TDD) the same channel or by use of a separate frequency channel (frequency division duplex, or FDD). Recent advances in antenna design and signal cancellation methods have facilitated building of a full duplex physical channel. The use of full duplex has been shown to result in significant improvements in the throughput of a system/link. Most of the changes made for enabling full duplex have been on the physical or medium access control (MAC) layers.

SUMMARY

Systems and methods are described for transmitting data to a receiving node that may be simultaneously transmitting, comprising: storing, at a transmitting node, a probability that the receiving node supports simultaneous transmission and reception; routing data packets based on the stored probability to the receiving node; sending a request to send the data packets while the receiving node may be simultaneously transmitting; receiving a clear-to-send message from the receiving node; and sending the data packets to the receiving node.

The data packets may be sent with a duration value in a message header. The transmitting node and the receiving node may be Wi-Fi nodes in a mesh network. A map of the topology of the network may be computed and, at the transmitting node, a full duplex probability may be stored for each node in the network. Acknowledgement messages may be sent.

Systems and methods are also described for receiving data at a node that may be simultaneously transmitting, comprising: receiving a request to send data from a requesting node while simultaneously transmitting data; determining whether a transmit radio resource may be available; and sending a clear-to-send message to the requesting node. wherein the node and the requesting node may be Wi-Fi nodes in a mesh network. further comprising computing a map of the topology of the network; and updating, at the node, a full duplex probability for each node in the network based on the request to send data.

A base station is also described, comprising: a processor configured to route requests for data from a mesh network node; a memory configured to store a routing table and a probability for each node regarding full duplex capability; a first radio transceiver coupled to the processor and configured to receive and send data using a full duplex wireless protocol; and a second radio transceiver coupled to the processor, wherein the first and the second radio transceiver may be configured to receive data from the processor based on the stored routing table and the stored probability, and may be configured to send data to other nodes in the network.

BRIEF DESCRIPTION OF THE DRAWINGS

FIG. 2 is an illustration of a table representing data in a network node, in accordance with some embodiments.

DETAILED DESCRIPTION

Figure 1:
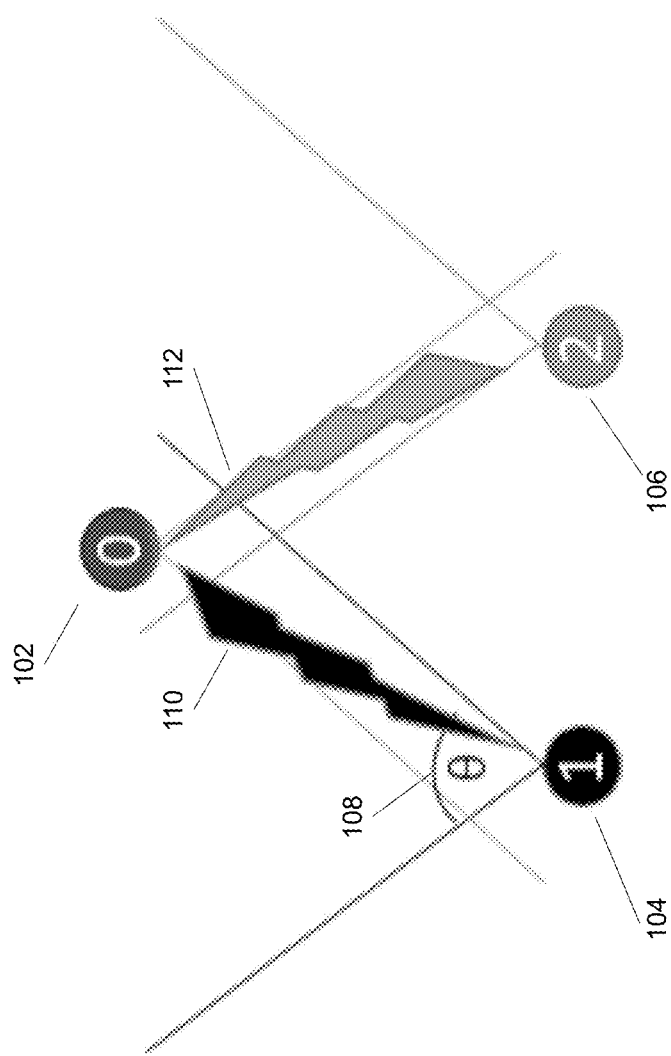
FIG. 1 is a schematic drawing of transmission to and from a network node, in accordance with some embodiments.

Wireless base stations may use multiple antennas to communicate with, for example, each other or to user equipments (UEs), thereby providing access to those UEs, and a macro-cell base station to provide backhaul for the UEs. The wireless connection is known as an air interface, and is implemented as a combination of a physical layer and a medium access control (MAC) layer.

However, in traditional wireless networks, the physical layer is implemented as a half-duplex channel and may be used only for either transmit or receive. In order to provide both transmit and receive capability, either time multiplexing (time division duplex, or TDD) the same channel or by use of a separate frequency channel (frequency division duplex, or FDD).

Recent advances in antenna design and signal cancellation methods have enabled the use of a full duplex physical channel. The use of full duplex has been shown to result in significant improvements in the throughput of a system/link. Most of the changes made for enabling full duplex have been on the physical or medium access control (MAC) layers.

Also known in the art are techniques for providing self-interference cancellation (SIC). With SIC, the signal transmitted by a node does not self-interfere with the signal it receives from other nodes. The antenna layout and digital cancellation systems at each node is configured for SIC. See, e.g., "Applications of Self-Interference Cancellation in 5G and Beyond" by Hong et al., IEEE Comm's Magazine, Vol. 52, No. 2 (2014); "Full Duplex Radios," Bharadia et al., SIGCOMM 2013; and Home Page of the Stanford Networked Systems Group, Full Duplex Project, available at http://snsg.stanford.edu/projects/full-duplex/, each of which is incorporated herein by reference in their entirety. See also A. K. Khandani et al., "Two-Way Wireless," presentation given at Univ. of Waterloo on Apr. 25, 2012, and U.S. Pat. No. 7,817,641, US20130301487, WO2013173250, each of which is also incorporated herein by reference in their entirety.

Systems and methods are described for point-to-point and point-to-multipoint full duplex networking. In some embodiments, physical, medium access control (MAC), and routing protocols are integrated. In some embodiments, cross-layer optimization by the use of a full duplex capability table in performing routing and messaging is used to increase the channel utilization of full duplex networks, thereby making it possible for multiple nodes to communicate simultaneously over the same channel. In some embodiments, such full duplex capability is provided using Wi-Fi or Wi-Fi-like wireless protocols in a mesh network.

In some embodiments, a mesh network may be created using a plurality of mobile base stations provided with full-duplex capability. The mobile base stations may be in-vehicle base stations. Such base stations may be used as part of a network used to rapidly deploy a network in an area where fixed cell towers are unavailable or impractical.

In such a situation, the mobile base stations need to be able to communicate with each other and with mobile devices (i.e., access), as well as with the broader Internet or other outside communications networks (i.e., backhaul). Access may mean the provision of connections from the mobile base station to one or more user equipments (UEs). Backhaul may refer to the use of a connection from a base station to a network that is connected to the Internet, an IP network connected to the Internet, a private network or a carrier network for sending and receiving data to and from one or more UEs connected to the base station. Backhaul networks, while traditionally using wired connections, may also use wireless connections, including n/NLOS connections, directional microwave connections, satellite connections, etc.

In some embodiments, opportunistically and/or dynamically creating full/half duplex links between participating nodes may facilitate full-duplex communication. The system is described with reference to a Request-To-Send/Clear-To-Send (RTS/CTS) based Wi-Fi network without loss of generality. The same methods can, in principle, be extended to any wireless network setup in ad-hoc or infrastructure mode or to a hybrid of both.

Consider a three-node Wi-Fi mesh network, although more nodes may of course be used. Each node uses a CSMA/CA protocol along with a RTS/CTS handshake to transmit on the channel. Every time a node observes a RTS/CTS packet on the network, it may populate a Full Duplex Candidate (FDC) table consisting of transmit/receive node IDs. This table can be populated using MAC/PHY layer packet information and/or can be based on higher layer packets information (like routing packets). This data can then be used by each node to compute a collision avoidance (CA) weight associated with other nodes in the network. In addition to the data mentioned above, other data like global positioning system (GPS) coordinates, antenna orientation, or other information can also be received and/or stored in the FDC table. In some embodiments, computation of this weight can be done at the node or by a central computing resource or a combination of the two. The node also may decide whether a neighbor node will be able to support full duplex based on the transmissions at that instant. It can also use the duration field of the RTS/CTS packet to predict activity on the channel over an interval of time. No modification of application layer software or layer 3 and above is required.

Figure 5:
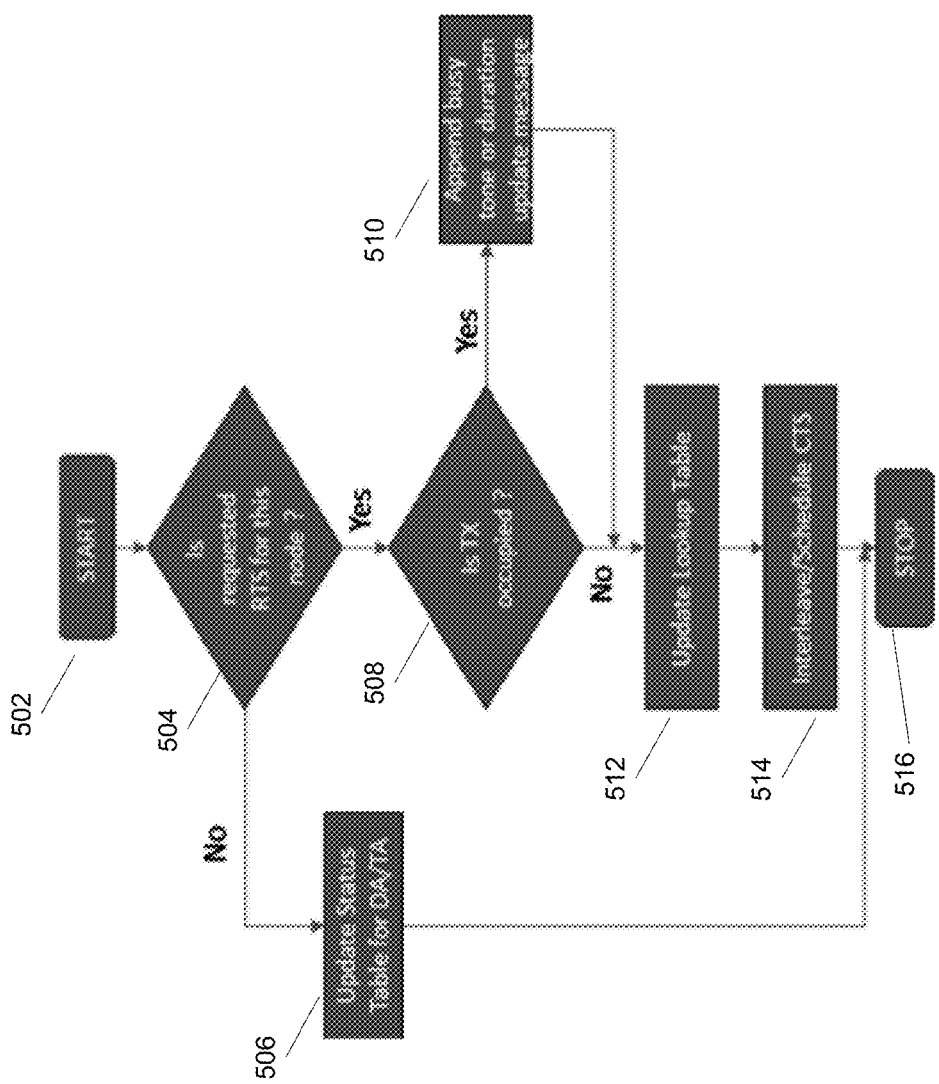
FIG. 5 is a flowchart of a receive channel monitoring process, in accordance with some embodiments.
Figure 6:
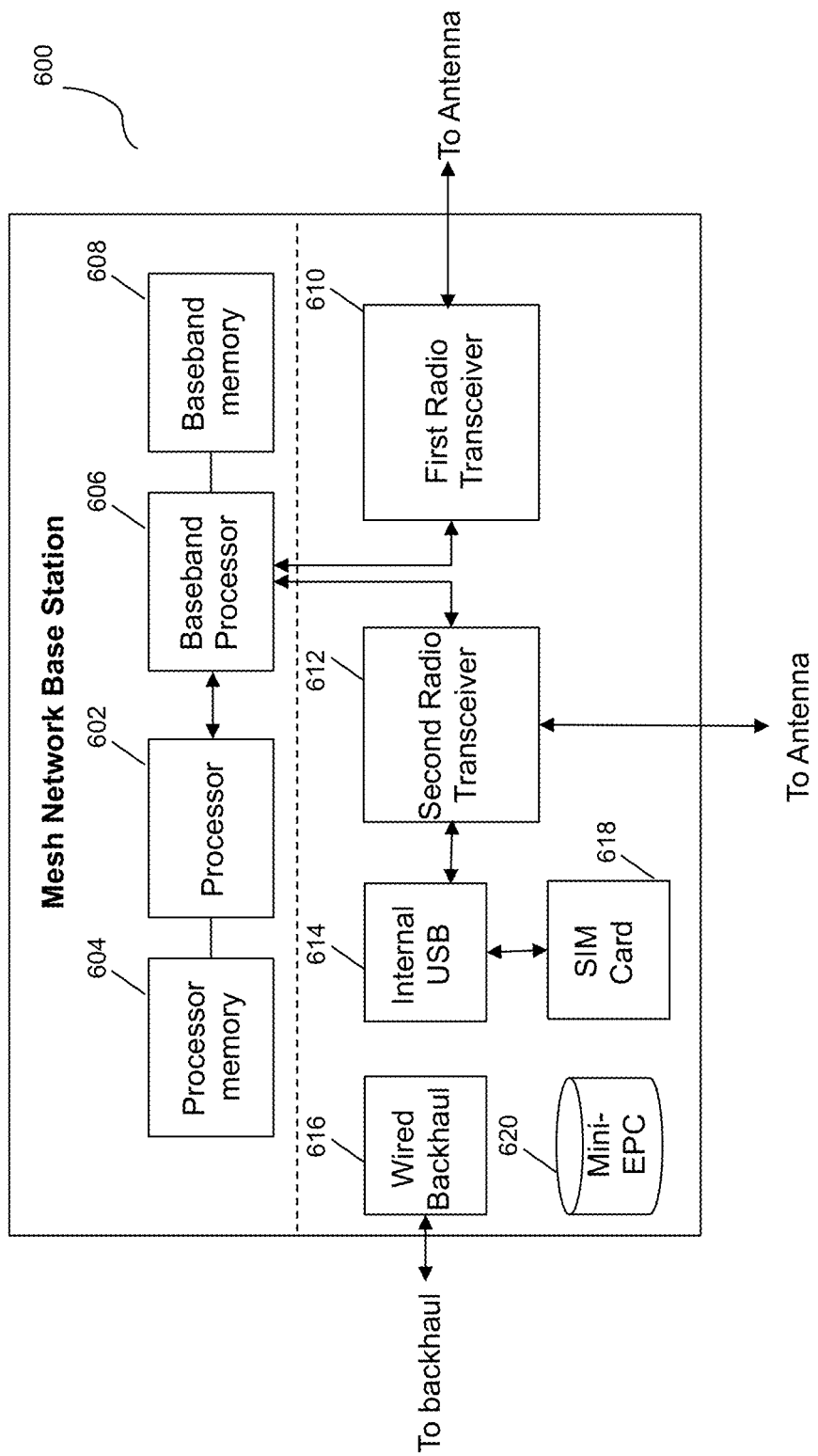
FIG. 6 is a system diagram of a base station, in accordance with some embodiments.

In operation, when Node 1 wants to transmit data to Node 0 and Node 0 is already transmitting data to Node 2, Node 1 will first look at the FDC table. If the RX channel on Node 0 is available and if the collision avoidance (CA) weight is lower than the threshold then it will initiate RTS request to Node 0. Note that if the CA weight is higher than the threshold, using direction antenna tuning (direction or beam width θ in case of phase arrays), Node 1 can still transmit the data. This algorithm is shown in FIG. 6. The algorithm for Node 0, which is targeted for full duplex communication is shown in FIG. 5. Since Node 0's RX channel is free, it can receive a transmission from Node 1 and hence will send a CTS to Node 1. If a CTS is received, then Node 1 can start transmitting data to Node 0. In order to make sure that the no collisions occur on ACK from Node 2, Node 0 can send a series of dummy packets to Node 2 till transmission from Node 1 is finished.

In some embodiments, a first mesh network base station is provided with in-band backhaul capability. Other network nodes connected to the first mesh network base station are then enabled to use the first mesh network base station's full-duplex backhaul as backhaul for their respective UEs. In some embodiments, more than three nodes are supported by the systems and methods described herein.

In some embodiments, each RTS/CTS message may be accompanied by an ACK message. In some embodiments, RTS and CTS messages may include at least a duration field. In some embodiments, the RTS and CTS messages may also include a sender and a recipient field.

In some embodiments, physical layer carrier sense may be used in place of RTS/CTS. In some embodiments, physical layer carrier sense may be used simply to determine whether it is appropriate to check, using RTS/CTS, whether a node is full-duplex capable. In some embodiments, a duration field in a MAC header may be used in place of carrier sense, such as for 802.11n. In some embodiments, a network allocation vector (NAV) may be used in place of carrier sense. In some embodiments, the network allocation vector may contain a counter value that counts down to zero at a uniform rate, and that is set to an initial value based on a duration field of a transmission. In some embodiments, the network allocation vector may be used to indicate without RTS/CTS whether a node is full-duplex capable. In some embodiments, duplicate NAVs may be stored for purposes of providing carrier sense on both halves of a full-duplex connection.

In some embodiments, whether a node is full-duplex capable is recorded in the routing table, either as a new logical network interface, or as an indication that the existing interface is a full-duplex interface. In some embodiments, whether a node is full-duplex capable may be reflected in a routing table by the use of higher routing priorities for routes that utilize the full-duplex connection. This may allow messages to be sent sooner, as the full-duplex connection may be subject to less waiting than an equivalent non-full duplex connection.

FIG. 1 is a schematic drawing of transmission to and from a network node, in accordance with some embodiments. In FIG. 1, network node 102 is sending data 112 to network node 106. Network node 104 begins in an observation state. Network node 102 is within a transmission angle 108 of network node 104, and can be seen by network node 104. Network node 106 is not within the transmission angle and cannot be seen by network node 104. Likewise, network node 106 cannot see network node 104 directly. However, when network node 102 transmits signal 112 to network node 106, a portion of the signal is received as interference by network node 104.

In operation, network node 104 begins in an observation state, and observes that network node 102 is transmitting to network node 106. Network node 104 updates its internal full duplicate candidate table accordingly. When network node 104 becomes aware that data is waiting to be sent to network node 102, it may send a request to send (RTS) message to network node 102 to request to send data to network node 102, even while transmission 112 is continuing. If node 102 is full-duplex capable, it may reply with a clear to send (CTS) message. If node 102 is not full-duplex capable, it will typically not reply, since it is busy sending data via transmission 112. In this way, node 104 is able to determine whether node 102 is full-duplex capable. Optionally, acknowledgement (ACK) messages are sent in response to each RTS and CTS message. In some embodiments, whenever node 102 is transmitting, node 104 is able to determine whether it is capable of full duplex by sending an RTS message. The full-duplex capable nature of node 102 may be retained for future use.

If node 106 receives a CTS message from node 102, it records the fact that node 102 is full duplex capable. Node 102 then sends transmission 112 to node 106, at the same time as it is receiving transmission 110. It is understood that, in the case that network node 102 initiates transmission 112 to node 106, node 102 may send an RTS and may receive a CTS from node 106, and may then commence transmission 112 even while receiving transmission 110.

In some embodiments, node 102 may perform self-interference cancellation to cancel interference caused by transmission 110 to transmission 112.

In some embodiments, a cloud coordination server may be used to allow each node to have knowledge of the location of the other nodes, thus alleviating the "hidden node problem." The cloud coordination server may enable node 106 to be aware of transmission 110 from node 104 even when transmission 110 is out of the field of view of node 106.

FIG. 2 is an illustration of a table representing data in a network node, in accordance with some embodiments. Data regarding the status of neighbor nodes may be stored, in some embodiments, including regarding whether transmission is currently occurring, at column 206; whether reception is currently occurring, at column 208; the value of an arbitrary collision avoidance weight value 210; and a full duplex candidate value 212 for each node, here including node 102 at row 202 and node 106 at row 204. In the exemplary table shown, the table is being stored at node 104.

In some embodiments, the table may be stored in memory or in non-volatile memory at node 104. In some embodiments, the table may be written to disk or transmitted to another network node, either to inform other nodes in a mesh network or to inform a central cloud coordination server. In some embodiments, the table may be consulted to update a routing table. In some embodiments, the table may be consulted every time routing is performed; in other embodiments, the table may be updated after a certain interval, or the routing table may be updated after a certain interval.

Figure 3:
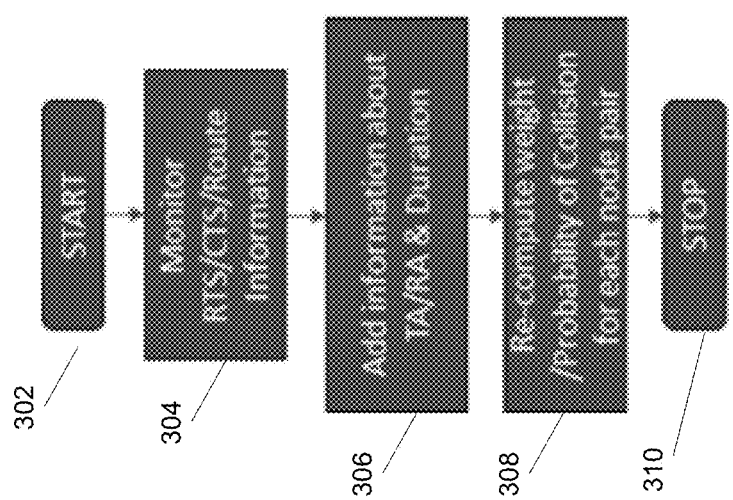
FIG. 3 is a flowchart of a transmission channel monitoring process, in accordance with some embodiments.

FIG. 3 is a flowchart of a transmission channel monitoring process, in accordance with some embodiments, from the perspective of node 104. At step 302, execution begins. At step 304, any RTS/CTS operations in progress may be monitored, as well as any updated routing information. At step 306, information about tracking areas and neighboring radio access networks may be determined. This information may include information about transmissions being made by neighboring nodes, including duration of such transmissions. This information may include determining all visible nodes and creating a map of the topology of the network. This information may include consulting a cloud coordination server for more information about the network. At step 308, based on the information determined in steps 304 and 408, a weight may be computed for each pair of nodes that are known in the network. The weight may be a probability of collision, and may be between 0 and 1, where the probability of a collision is based on whether another node is using either the send or the receive channel, for a node not capable of full duplex, or using one of the send or the receive channel, for a node capable of full duplex. The information is then saved in a table, like the one shown in FIG. 2. At step 310, execution is suspended for a configurable interval of time.

Figure 4:
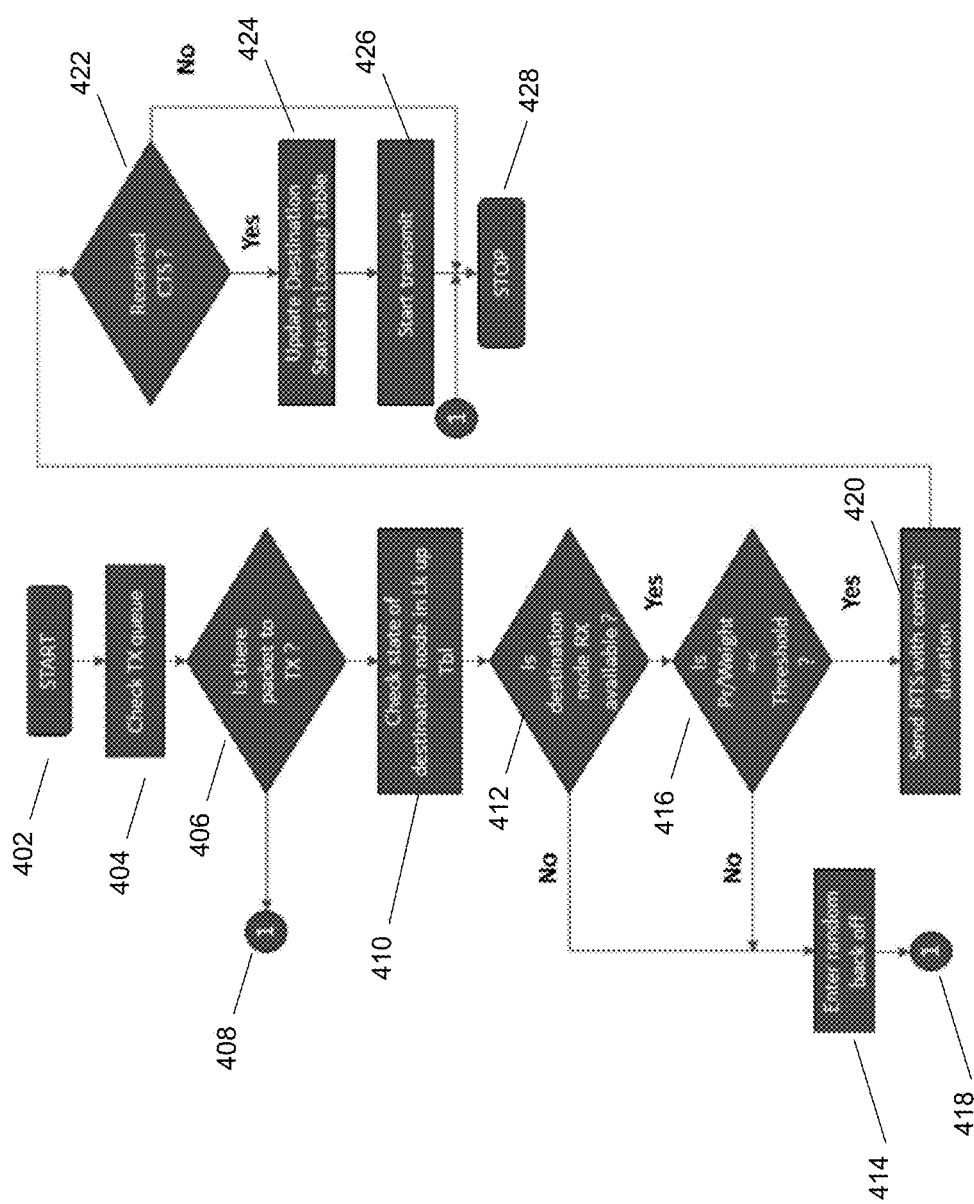
FIG. 4 is a flowchart of a full duplex transmission process, in accordance with some embodiments.

FIG. 4 is a flowchart of a full duplex transmission process, in accordance with some embodiments. At step 402, operation starts. At step 404, a transmit queue is checked for data to be transmitted. At step 406, if data is present to be transmitted, a packet is created to be transmitted; otherwise operation proceeds to step 408. At step 410, before the packet is transmitted, the state of the recipient node is checked in a lookup table, such as the full duplex capability table described above. If the lookup table does not have current information, it may be updated, in some embodiments.

At step 412, the transmitting node determines whether the recipient node has its receive functionality available. If the recipient node does not support full duplex, this will only be when the recipient node is idle. If the recipient node does support full duplex, this may be when the recipient node is idle, or when only the transmit function of the recipient node is active. A probability from the FDC table may be used to determine whether the recipient node is available by performing a simulation based on the probability, or by rounding the probability, or by another means. If the receive functionality is not available, operation proceeds to step 414. Otherwise, at step 416, the probability and/or the weight and/or the probability divided by the weight is compared to a configurable threshold. If the probability divided by the weight is greater than a threshold, operation proceeds to step 414. If the probability divided by the weight is less than or equal to a threshold, operation proceeds to step 420.

At step 414, the receiving resource is not available. A random backoff algorithm is used to postpone transmission, and operation proceeds to step 418, which causes operation to terminate at step 428.

At step 420, the receiving resource is available, and an RTS message is sent. The duration field of the RTS request is set to a time value that will allow the data in the transmit queue to be transmitted to the receiving node. Operation proceeds to step 422, in which the system waits for a CTS message to be received from the receiving node. In some embodiments, ACK messages may also be received and sent.

At step 424, if the CTS is received, the CTS is processed to update the destination status in the FDC lookup table, and transmission is started at step 426. Otherwise, if no CTS is received, the receive resource is not available because the target node does not support full duplex, and operation should be terminated at step 428.

FIG. 5 is a flowchart of a receive channel monitoring process, in accordance with some embodiments, such as would be implemented at node 102. At step 502, operation starts. At step 504, an input queue is processed to determine whether an RTS has been received for full duplex reception. In the case that no RTS has been received, processing proceeds to step 506, which causes the status table to be updated for the present tracking area, and then causes operation to stop at step 516.

If an RTS is received, an ACK is optionally sent (not shown). Then, at step 508, it is determined whether a transmit radio resource is occupied. If the resource is occupied, at step 510, a message is returned to the RTS sender with an ACK or other message that indicates that the sender is not clear to send. The message may include an appended busy signal or duration update message.

If the RTS has been received and the transmit radio resource is not occupied, operation proceeds to step 512. At step 512, the lookup table at node 102 is updated with information about the requesting node. Next, at step 514, a CTS message is prepared, and the message may be interleaved with other transmissions or otherwise scheduled. Once the CTS has been scheduled or sent, operation stops at step 516.

A physical device for use with the methods described herein is disclosed in connection with FIG. 6.

FIG. 6 depicts a block diagram of an exemplary base station, in accordance with some embodiments. Mesh network base station 600 may include processor 602, processor memory 604 in communication with the processor, baseband processor 606, and baseband processor memory 608 in communication with the baseband processor. Base station 600 may also include first radio transceiver 610 and second radio transceiver 612, internal universal serial bus (USB) port 614, and wired backhaul connection 616. A subscriber information module card (SIM card) 618 may be coupled to USB port 614. In some embodiments, the second radio transceiver 612 itself may be coupled to USB port 614, and communications from the baseband processor may be passed through USB port 614. A mini-evolved packet core (EPC) module 620 may also be included for authenticating users and performing other EPC-dependent functions when no backhaul link is available at all. Other elements and/or modules may also be included, such as a home eNodeB, a local gateway (LGW), a self-organizing network (SON) module, or another module. Additional radio amplifiers, radio transceivers and/or wired network connections may also be included. Device 600 may also be identified as a converged wireless station (CWS) or unified radio access network (UniRAN), in some embodiments.

Processor 602 and baseband processor 606 are in communication with one another. Processor 602 may perform routing functions, and may determine if/when a switch in network configuration is needed. Baseband processor 606 may generate and receive radio signals for both radio transceivers 610 and 612, based on instructions from processor 602. In some embodiments, processors 602 and 606 may be on the same physical logic board. In other embodiments, they may be on separate logic boards.

The first radio transceiver 610 may be a radio transceiver capable of providing LTE eNodeB functionality, and may be capable of higher power and multi-channel OFDMA. The second radio transceiver 612 may be a radio transceiver capable of providing LTE UE functionality. Both transceivers 610 and 612 are capable of receiving and transmitting on one or more LTE bands. In some embodiments, either or both of transceivers 610 and 612 may be capable of providing both LTE eNodeB and LTE UE functionality. Transceiver 610 may be coupled to processor 602 via a Peripheral Component Interconnect-Express (PCI-E) bus, and/or via a daughtercard. As transceiver 612 is for providing LTE UE functionality, in effect emulating a user equipment, it may be connected via the same or different PCI-E bus, or by a USB bus, and may also be coupled to SIM card 618.

SIM card 618 may provide information required for authenticating the simulated UE to the evolved packet core (EPC). When no access to an EPC is available, a mini-EPC within device 600 may be used, or a mini-EPC located within the confines of the mesh network. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul 616 may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 610 and 612, which may be Wi-Fi 802.11a/b/g/n/ac, 802.16 (WiMAX), Bluetooth, ZigBee, microwave (including line-of-sight microwave), or another wireless backhaul connection. Any of the wired and wireless connections may be used for either access, mesh, or backhaul, according to identified network conditions and needs, and may be under the control of processor 602 for reconfiguration. For example, LTE may be used in a proprietary mesh configuration, or Wi-Fi may be used in a mesh configuration.

In some embodiments, an X2 protocol interface may be used to perform RTS/CTS signaling. Signaling may be performed either between a macro cell and an eNodeB, between eNodeBs, between mesh nodes, or via another signaling path. In some embodiments, signaling may be performed between a policy server and the one or more base stations, for storing and retrieving policies relating to RTS/CTS compatibility, history, and usage.

In some embodiments, the use of a mobile mesh base station may cause interference to users presently communicating with a macro cell. In the case that a mobile mesh base station is present, the mobile mesh base station may cause a handoff by the users presently communicated with the macro cell. Once the mobile mesh base station has received the handoff, and becomes the active base station for the users, the mobile mesh base station may provide access to the users. Backhaul for the users may be provided by the use of a full-duplex connection provided by one or more nodes in the mesh. The full-duplex connection may be a self-interference cancelling connection for providing backhaul over LTE.

In some embodiments, a mobile mesh network may support multiple full-duplex connections. For example, a single mobile mesh network node may have a full-duplex connection for providing wireless backhaul to a gateway with a wired network node. Additionally, nodes may have full-duplex connections between each other. The links may be in any configuration between nodes. In some embodiments, where the nodes are connected via LTE, the full-duplex connections may be used to provide role reversal between UE and eNodeB roles to optimize bandwidth in the mesh network.

In some embodiments, one or more mobile mesh network nodes may have local packet cores internal to the network nodes. Additional applications may be provided within the mobile mesh network, such as push-to-talk (PTT).

In some embodiments, carrier aggregation may be used in conjunction with the full-duplex and/or self-interference cancellation techniques described herein. In some embodiments, beamforming and/or multiple-input multiple-output antennas may be used to provide spatial interference cancellation, in addition to the self-interference cancellation techniques described herein.

In some embodiments, a mobile base station may be on a drone or otherwise airborne. In some embodiments, the mobile base station may be on a fixed or mobile tower.

In some embodiments, a television white space band may be identified as available, either by direct monitoring or by consultation of a monitoring database. The available TVWS band may be used for full-duplex communications, in accordance with the embodiments described elsewhere herein.

In some embodiments, a mobile base station may be configured to operate in two modes. In a first mode, a mobile base station may be configured to provide full-duplex communication with other base stations, but half-duplex communication with UEs. In a second mode, a mobile base station may be configured to provide full-duplex communication with both other base stations and with UEs. One or both modes may be supported. In some embodiments, a third mode may be provided in which the communications between UEs are provided using asymmetric LTE links, with role reversal being used as needed to maximize available network capacity, but using self-interference cancellation on the asymmetric links.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, that the various characteristics described above of the various embodiments may be combined in different fashion than described above, and that numerous changes in the details of implementation of the disclosure may be made without departing from the spirit and scope of the disclosure, which is limited only by the claims which follow.

The invention claimed is:

1. A method for incorporating half duplex devices into a full duplex and half duplex mixed mode network, comprising:
   storing, in a table at a transmitting node, capability data, the capability data reflecting whether a particular node in the network has simultaneous transmission and reception capability;
   waiting, at the transmitting node, to make a transmission to a receiving node, the transmitting node not having capability data of the receiving node;
   sending, from the transmitting node, a first request-to-send message broadcast over the network to the receiving node while the receiving node is simultaneously transmitting;
   updating, at the transmitting node, capability data of the receiving node based on a first clear-to-send message from the receiving node observed over the network;
   calculating a collision probability using the capability data of the receiving node;
   sending a second request to send message for data packets while the receiving node is simultaneously transmitting, based on the collision probability;
   receiving a second clear-to-send message from the receiving node; and
   sending the data packets to the receiving node.

2. The method of claim 1, further comprising sending the data packets with a duration value in a message header.

3. The method of claim 1, wherein the transmitting node and the receiving node are Wi-Fi nodes in a mesh network.

4. The method of claim 1, further comprising computing a map of the topology of the network; and storing, at the transmitting node, capability data and a collision probability for each node in the network.

5. The method of claim 1, further comprising sending acknowledgement messages.

6. The method of claim 1, wherein the transmitting node and the receiving node are Wi-Fi nodes in a mesh network.

7. The method of claim 1, further comprising computing a map of the topology of the network; and updating, at the transmitting node, capability data and a collision probability for each node in the network based on additional request to send messages.

8. The method of claim 1, further comprising populating nodes in a full duplex candidate table using medium access control (MAC) layer packet information, global positioning system (GPS) coordinates or antenna orientation.

9. The method of claim 8, further comprising populating the full duplex candidate table with capability data regarding whether a node has full duplex transmit and receive capability, and a collision probability based on the capability data.

10. The method of claim 9, further comprising sharing portions of a full duplex candidate table via a coordination server, thereby avoiding a hidden node problem.

11. The method of claim 9, further comprising populating the full duplex candidate table with a currently transmitting status and a currently receiving status.

12. The method of claim 1, further comprising using the duration field of a request to send packet to predict activity on a channel over an interval of time.

13. The method of claim 1, further comprising sending a request to send (RTS) message while each particular node is transmitting to determine whether each of the particular nodes is capable of full duplex communication.

14. The method of claim 1, further comprising comparing a first quantity, the first quantity comprising the collision probability divided by a weight, to a threshold.

15. The method of claim 1, wherein the first clear-to-send message is sent from the receiving node in response to a third request to send message from a third node.

16. The method of claim 1, wherein the receiving node has full duplex capability, and further comprising the receiving node sending dummy packets to a third node while receiving packets from the transmitting node.

17. A base station comprising:
   a processor configured to route requests for data at a mesh network node;
   a memory configured to store a routing table and observed capability data and a collision probability for each node, the capability data regarding full duplex capability;
   a first radio transceiver coupled to the processor and configured to receive and send data using a full duplex wireless protocol; and
   a second radio transceiver coupled to the processor, wherein the first and the second radio transceiver are configured to:
   observe a clear-to-send message broadcast over the network from a receiving node while the receiving node is transmitting;
   update, in the memory, the observed capability data for the receiving node based on the clear-to-send message observed over the network;
   calculate a collision probability using the observed capability data of the receiving node; and
   send a request to send message for data packets while the receiving node is simultaneously transmitting, based on the collision probability and the observed capability data.

18. The base station of claim 17, wherein the base station is located in a mobile vehicle.

19. The base station of claim 17, wherein the base station has a wireless backhaul connection.

20. A non-transitory computer-readable medium containing instructions that, when executed by a processor at a transmitting node in a wireless network, cause the transmitting node to perform steps comprising:
   storing, in a table at a transmitting node, capability data, the capability data reflecting whether a particular node in the network has simultaneous transmission and reception capability;
   waiting, at the transmitting node, to make a transmission to a receiving node, the transmitting node not having capability data of the receiving node;
   sending, from the transmitting node, a first request-to-send message broadcast over the network to the receiving node while the receiving node is simultaneously transmitting;
   updating, at the transmitting node, capability data of the receiving node based on a first clear-to-send message from the receiving node observed over the network;
   calculating a collision probability using the capability data of the receiving node;
   sending a second request to send message for data packets while the receiving node is simultaneously transmitting, based on the collision probability;
   receiving a second clear-to-send message from the receiving node; and
   sending the data packets to the receiving node.

* * * * *